(12) United States Patent
Bornemann et al.

(10) Patent No.: US 8,038,725 B2
(45) Date of Patent: Oct. 18, 2011

(54) HYDROPHILIC POLYOLEFIN MATERIALS AND METHOD OF PRODUCING SAME

(75) Inventors: Steffen Bornemann, Jessnitz (DE); Volker Joerres, Mauldin, SC (US); Michael Voges, Hoechst (DE)

(73) Assignee: Fiberweb Corovin GmbH, Peine (DE)

( * ) Notice: Subject to any disclaimer, the term of this patent is extended or adjusted under 35 U.S.C. 154(b) by 1029 days.

(21) Appl. No.: 10/538,024

(22) PCT Filed: Dec. 6, 2003

(86) PCT No.: PCT/EP03/13826
§ 371 (c)(1),
(2), (4) Date: Nov. 21, 2006

(87) PCT Pub. No.: WO2004/052985
PCT Pub. Date: Jun. 24, 2004

(65) Prior Publication Data
US 2007/0167549 A1    Jul. 19, 2007

(30) Foreign Application Priority Data

Dec. 11, 2002 (DE) .................................. 102 57 730
Feb. 25, 2003 (DE) .................................. 103 07 867

(51) Int. Cl.
*D01F 11/04* (2006.01)
*D04H 1/56* (2006.01)

(52) U.S. Cl. ....... 8/115.54; 524/318; 524/315; 442/414; 554/227

(58) Field of Classification Search ................. 524/318, 524/315; 442/414; 428/376; 8/115.54
See application file for complete search history.

(56) References Cited

U.S. PATENT DOCUMENTS

| | | | |
|---|---|---|---|
| 6,008,145 A * | 12/1999 | Dzen et al. | 442/118 |
| 6,211,101 B1 | 4/2001 | Tsutsui et al. | |
| 2001/0008965 A1 * | 7/2001 | Kinn et al. | 604/366 |
| 2002/0019184 A1 | 2/2002 | Birnbrich et al. | |

\* cited by examiner

*Primary Examiner* — Harold Pyon
*Assistant Examiner* — Katie L Hammer
(74) *Attorney, Agent, or Firm* — Alston & Bird LLP

(57) ABSTRACT

The invention relates to polyolefin materials, in particular fibers, and/or filaments, and/or nonwovens, and/or nonwoven products made from at least one polyolefin and a melt additive containing a fatty acid ester, wherein a subsequent activation of the fatty acid ester contained in the melt additive occurs on the surface of the polyolefin materials by applying a formulation, which contains a silicone compound and a quaternary ammonium compound.

21 Claims, 2 Drawing Sheets

HYDROPHILIC POLYOLEFIN MATERIALS AND METHOD OF PRODUCING SAME

FIELD AND BACKGROUND OF THE INVENTION

The present invention relates to hydrophilic polyolefin materials, in particular fibers and/or filaments, and/or nonwovens, and/or nonwoven products produced from a mixture of at least one polyolefin and at least one melt additive containing a fatty acid ester, with the polyolefin materials including a subsequent activation of the fatty acid ester contained in the melt additive on the surface of the polyolefin materials.

Polyolefins, in particular polyethylene, polypropylene, as well as their copolymers have become established as materials for the production of nonwovens.

Typical applications, in which nonwovens of polyolefins are used, include hygiene products (baby and female hygiene, incontinence products), as well as filter materials. When nonwovens are used, for example as top sheet in baby diapers, they will have to be permeable to body fluids, such as, for example, urine. Then, because of the distinctly hydrophobic character of the polyolefins, a hydrophilic treatment will be needed, which occurs preferably later in the form of a so-called topical treatment. In this process, it is common to use aqueous liquors, which contain amphiphilic surface-active substances, preferably cationic (quaternary ammonium salts), anionic (sulfates, phosphates), or nonionic (ethoxylates, esters, alcohols, silicones) components, or formulations from these substances.

U.S. Pat. No. 6,008,145 discloses a formulation for the permanent hydrophilation of polyolefin fibers, polyolefin filaments, and textiles made therefrom with the use of quaternary ammonium compounds.

According to U.S. Pat. No. 963,929 and DE 196 45 380, nonionic surfactants are used in combination with cationically modified polydimethyl siloxane.

U.S. Pat. No. 6,028,016 discloses a formulation and a method for making nonwovens permanently wettable, with the formulation including a viscosity modifier for a purposeful adjustment of the viscosity of normally unusable, surface-active substances, in that an alkylated polyglycoside is used in combination with surface-active substances, for example, mixtures of modified castor oil and sorbitan monooleate.

A further method of hydrophiling polyolefin fibers or polyester fibers is described in DE 198 51 688, which discloses a mixture of polyolefin or polyester, as well as a compound that includes at least one substance from the class of ethoxylated sugar esters.

U.S. Pat. No. 6,211,101 discloses durable hydrophilic fibers and nonwovens made therefrom, which are intended for use preferably in medical and hygiene applications, and wherein the fiber treating agent contains an ampho-ionic surface-active betain and a dicarboxylic acid ester produced from high-molecular hydroxy-fatty acid esters.

In practice, however, it is found that the topical treatment of nonwovens is connected with the following disadvantages:
1. In use, the surface-active substances are washed out by urine and other body fluids, whereby the hydrophilic properties are successively lost.
2. The washed-out surface-active substances interfere with absorption and fluid distributing processes in hygiene products.
3. The distribution of the surface-active substances on the nonwoven often proceeds only irregularly.

To improve processability of polyolefins, one often uses so-called process auxiliaries as melt additive. In this connection, one uses as "external lubricants," for example, fatty-acid derivatives which are provided with polar groups. (Ullannn's Encyclopedia of Industrial Chemistry, VCH Weinheim, 5th Ed., Vol. A20, p. 479.)

However, until now such melt additives have not been widely used for a purposeful hydrophilation of polyolefin nonwovens. Because of phase incompatibility, hydrophilic residues migrate to the fiber surface. The migration in the semicrystalline fiber occurs not only in the course of the spinning process, but also after the spinning process.

For the use of hydrophilic melt additives, U.S. Pat. No. 5,439,734 discloses nonwovens with a durable wettability, consisting of a polyolefin with hydrophilic additives, which comprise fatty acids esterified with dihydroxylated polyethylene glycols.

Furthermore, U.S. Pat. No. 5,969,026 discloses wettable fibers and filaments consisting of polymers and incorporated wetting reagents, wherein the polymers are selected from the class of polyolefins, polyesters, and polyamides, and wherein the active substances essentially consist of a glyceride.

U.S. Pat. No. 5,240,985, U.S. Pat. No. 5,272,196, U.S. Pat. No. 5,281,438, U.S. Pat. No. 5,328,951, and U.S. Pat. No. 5,464,691 disclose amphiphilic additives for modifying polyolefins, with the amphiphilic compounds consisting of an A-B-A combination of a central hydrophilic group, for example, polyethylene glycol, linked to two side groups, which are selected from the class of fatty acids or long-chain alcohols.

Also known are from U.S. Pat. No. 5,696,191 and U.S. Pat. No. 5,641,822 surface-migrating, extrudable thermoplastic mixtures, consisting of at least one polyolefin and an additive, with the additive being a polysiloxane graft copolymer with polyalkene oxide side chains. By extruding the mixture, it is possible to produce wettable nonwovens, which continue to have the corresponding properties even after two years.

Likewise known are from US 2002/0019184 polymers with improved hydrophilicity, which are produced by adding a corresponding quantity of an additive consisting of fatty acids esterified with polyethylene glycols.

US 2001/0008965 discloses multicomponent fibers, wherein a first component consists of a hydrophobic polypropylene, and a second component of a blend of a hydrophobic polyolefin and a hydrophilic melt additive, with the second component being disposed at the surface of the fibers.

WO 98/42767 A1, WO 98/42776 A1, and WO 98/42898 A1 disclose a process of making a polyolefin blend with improved compatibility to adhesives and/or coatings. The blend consists of a polyolefin, a migrating amphiphile and a transition metal.

US 2002/0002242 A1 and WO 01/58987 A2 describe a possibility of increasing the surface energy of polymeric substrates by the use of new amphiphilic block copolymers, in that the block copolymers consisting of linear hydrophobic polymers or oligomers and a statistically hyperbranched polymer or oligomer, are treated in full or in part with lipophilic end groups.

U.S. Pat. No. 5,582,904 describes a method and a resultant end product, wherein hydrophobic polyolefin nonwovens are imparted hydrophilic properties. To this end, one adds to the polymer melt a required content of an alkoxylated fatty acid amine, optionally in combination with as much as 60% by weight of a primary fatty acid amide.

Furthermore, WO 00/71789 discloses polypropylene fibers and structures that can be produced therefrom. In this art, a fatty acid monoglyceride is added as melt additive to the polypropylene, and further additives are used in the form of hydrophilicity improvers and antimicrobial substances.

Last but not least, WO 02/42530 discloses fibers, filaments, and nonwovens, which consist of a melt blend of polyolefin and an additive, with the additive being a chemical substance composed of an alkyl chain and a hydrophilic oligomer. The produced nonwovens exhibit a durable wettability, preferably vis-à-vis body fluids.

The hygiene nonwovens that are hydrophilated with melt additives distinguish themselves in particular by a high permanence of the hydrophilic groups on the fiber surface. However, the hydrophilicity level as is achieved by melt additives, is in many cases too low to meet the requirements of the hygiene industry.

SUMMARY OF THE INVENTION

At this point the invention sets in. It is an object of the invention to provide hydrophilic polyolefin materials, in particular fibers, and/or filaments, and/or nonwovens, and/or nonwoven products, which purposefully and permanently exhibit respectively a level of hydrophilicity of the polyolefin materials as is required for the purpose of the application, and a permanence of the hydrophilic properties, and which include an initial wetting of the surface of the polyolefin materials.

In accordance with the invention, this object is accomplished by claims 1-13, which define hydrophilic polyolefin materials, in particular fibers, and/or filaments, and/or nonwovens, and/or nonwoven products, consisting of a mixture of at least one polyolefin and a melt additive, containing a fatty acid ester of the general formula

$R—CO—O—CH_2—CH_2—O—R'$, where R is a straight-chain or branched-chain alkyl residue with 23 to 35 carbon atoms, and where

$R'=H, —CH_3, —C_2H_5, —C_3H_7, —C_4H_9$, with the hydrophilic groups of the fatty acid esters including a subsequent activation on the fiber surfaces of the polyolefin materials by applying small quantities of a surface-active substance.

The mixture consisting of a polyolefin and a melt additive containing a fatty acid ester for producing the polyolefin materials is extruded in a known manner. Subsequently, fibers and/or filaments, and in turn subsequently therefrom nonwovens and/or nonwoven products are produced by a standard method. Thereafter, a subsequent activation of the fatty acid ester occurs in accordance with the invention by applying a surface-active substance, a formulation in the form of an aqueous preparation, to the fiber surface of the polyolefin materials.

Preferably, the polyolefin is selected from a group comprising homopolymers, copolymers, random polymers, and/or block (co)polymers of ethene and/or propene. However, also possible are copolymers with higher alkenes, in particular butene, hexene, and/or octene. Very suitable are in particular the following polymers:

Poly(ethylene), such as HDPE (high density polyethylene), LDPE (low density polyethylene), VLDPE (very low density polyethylene), LLDPE (linear low density polyethylene), MDPE (medium density polyethylene), UHMPE (ultra high-molecular polyethylene) XLPE (crosslinked polyethylene), HPPE (high-pressure polyethylene), polypropylene, such as isotactic polypropylene; syndiotactic polypropylene; metallocene catalyzed polypropylene; impact-modified polypropylene, random copolymers based on ethylene, propylene, and higher 1-olefins, block copolymers based on ethylene and propylene; EPM (poly[ethylene-co-propylene]); EPDM (poly[ethylene-co-propylene-co-diene]).

Also suited are graft copolymers, such as polymer blends, i.e., mixtures of polymers, which contain, among other things, the above-referenced polymers, for example, polymer blends based on polyethylene and polypropylene.

Also preferred are copolymers of ethene and/or propene with higher olefins and/or diolefins.

Especially preferred as polyolefin is a homopolymer of ethene or propene. In a preferred embodiment of the invention, the mixture contains 0.5 to 10% by weight, more preferably 0.5 to 3% by weight, most preferably 1 to 2.5% by weight of the melt additive. Furthermore, the mixture may contain titanium dioxide in an amount of 0.05% to 2% by weight, preferably 0.1 to 0.5% by weight. Preferred mixtures contain 96 to 99% by weight of homopolypropylene or homopolyethylene, 0 to 1% by weight of titanium dioxide, and 1 to 3% by weight of a melt additive. It has been possible to use such mixtures without problems for the production of a polyolefin material, such as, for example, a spunbond, and this despite the high temperatures prevailing in the thermoplastic melt in a range from 190 to 310° C. To produce the thermoplastic melt, the blend of the invention may first be mixed together in an unmelted state, and be subsequently melted, or, however, the melt additive and, if need be, additional additives, such as titanium dioxide may be supplied to the polymer melt in an extruder by means of lateral feed lines.

The invention furthermore relates to hydrophilic polyolefin materials, such as, for example, fibers, and/or filaments, and/or nonwovens, and/or nonwoven products, which may also contain bicomponent fibers. For example, it is possible to create a core-sheath structure in the production of the fibers or filaments. According to one configuration, only the sheath of the polyolefin material contains a melt additive. The core contains no melt additive. Another configuration provides for a core containing a homopolypropylene and a sheath containing in turn a homopolyethylene, which is treated with the melt additive. Structures of this type permit providing the melt additive only in those regions, which need it for the development of its hydrophilic property. Besides a core-sheath structure, a fiber or filament cross section may also have different multicomponent distributions. These may be, for example, segmented structures, side-by-side structures, noncircular geometries, or other structures.

A preferred realization of the invention for the subsequent activation of the fatty acid ester contained in the melt additive on the fiber surface of the polyolefin material is a formulation in the form of an aqueous preparation, which contains in accordance with the invention a cationically modified silicone compound and a quaternary ammonium compound which is a quaternized ester from fatty acids and triethanol amine. In this case, the formulation in the form of an aqueous preparation is set, preferably physically, on the fiber surface of the polyolefin material.

In one embodiment of the invention, the blend from which the hydrophilic polyolefin materials are made contains 0.01 to 0.5% by weight, preferably 0.05 to 0.15% by weight of the formulation for activating on the fiber surface the fatty acid ester that is contained in the melt additive.

The invention furthermore relates to a fiber, and/or filament, and/or nonwoven, and/or nonwoven products made from the polyolefin material of the invention.

The polyolefin materials of the invention, in particular fibers, and/or filaments, and/or nonwovens, and/or nonwoven products, produced from a mixture of at least one polyolefin and at least one melt additive containing a fatty acid ester, with the polyolefin materials including a subsequent activation of the fatty acid contained in the melt additive on the surface of the polyolefin materials, can be used besides their application in a so-called "top sheet", also in a so-called "acquisition layer." Because of their permanent hydrophilic properties, such polyolefin materials can be used besides their application in hygiene and/or medical products, also where a rapid absorption of fluid matters, for example, in filtration applications.

Thus, a filter layer may contain the hydrophilic polyolefin materials of the invention in the form of nonwovens, with the fluid being transported to a layer that extends farther below. Particles in the fluid may however be retained by the nonwoven. The rapid fluid absorption prevents fluid from collecting upstream of the nonwoven.

According to one embodiment, the polyolefin material of the invention has repeated strike-through times according to the EDANA testing method ERT 154.0-00 of less than 5 seconds.

It is further preferred that the polyolefin material has a repeated runoff, as determined by the EDANA test method ERT 152.0-99, of less than 25% by weight of the test fluid based on the applied quantity of the fluid.

BRIEF DESCRIPTION OF THE DRAWINGS

These objects and other advantageous realizations and further developments of the present invention are described in greater detail with reference to the following examples. The features described in this connection may lead with those described above to additional further developments, which are however not described in greater detail. In the drawing.

DETAILED DESCRIPTION OF THE INVENTION

Figure 1:
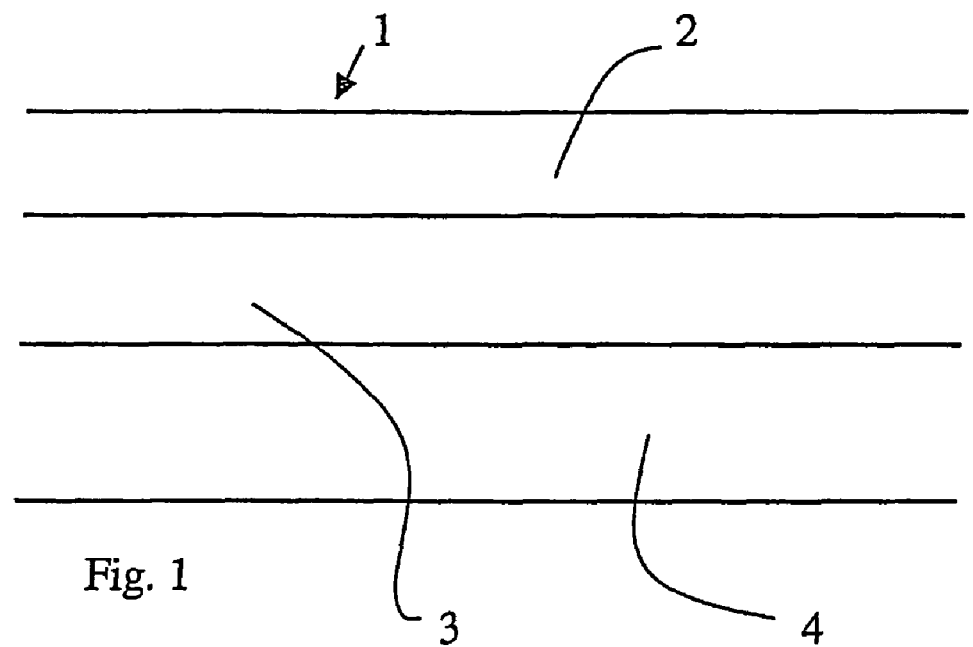
FIG. 1 is a fragmentary view of a hygiene product.

FIG. 1 is a fragmentary view of a hygiene product 1. The hygiene product 1 comprises a top sheet 2, a distribution layer 3, and a core 4. The top sheet 2 is made from a nonwoven of hydrophilic polyolefin materials according to the invention. The hydrophilic nonwoven produced from the polyolefin materials of the invention absorbs fluid and passes it on to the distribution layer 3. From the distribution layer 3, the fluid can be passed on to the core 4. In the core 4, the fluid is stored. Besides the hydrophilic property of the top sheet 2, also the distribution layer 3 can be produced from the hydrophilic polyolefin materials, and thus be highly hydrophilic. However, it is also possible to make the distribution layer 3 from a different thermoplastic material. For example, the top sheet 2 is a spunbonded nonwoven, whereas the distribution layer 3 is a meltblown nonwoven. Preferably, the distribution layer 3 has a greater hydrophilicity than the top sheet 2, preferably greater than at least 10%, more preferably greater than at least 20%. In this manner, a suction effect is realized from a surface of the top sheet 2 toward the distribution layer 3.

Figure 2:
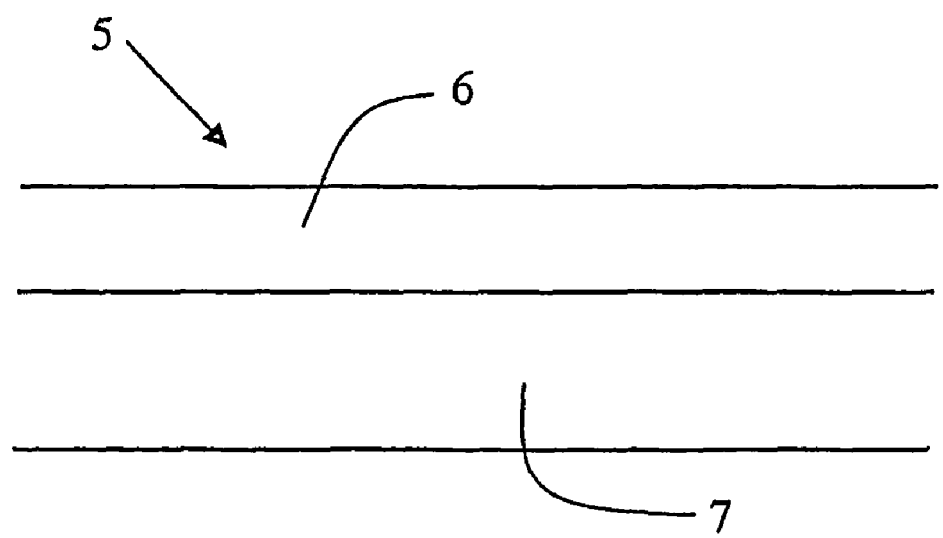
FIG. 2 is a fragmentary view of an oil absorption filter.

FIG. 2 is a fragmentary view of an oil filter 5. The oil filter 5 comprises a suction layer 6. The suction layer 6 is used on the one hand to absorb oil that comes into contact with the suction layer. On the other hand, the suction layer 6 also serves as a filter for particles contained in the oil and which are not allowed to move on. In the present embodiment, the suction layer 6 is followed by a further, not absolutely needed filter layer 7. The filter layer 7 is preferably finer pored than the suction layer 6. The suction layer 6 serves as a preliminary filter for the filter layer 7. The oil filter 5 can be intended, for example, for permanent use or, however, be also used only when need arises. The suction layer 6 is formed by a nonwoven produced from the hydrophilic polyolefin materials of the invention. The underlying filter layer 7 which may also have suction properties, can likewise be a nonwoven that is produced from the hydrophilic polyolefin materials of the invention. The suction layer 6 alone can also be used as an oil absorption material. This is used, for example, where oil leaking from machines or the like is to be collected.

Figure 3:
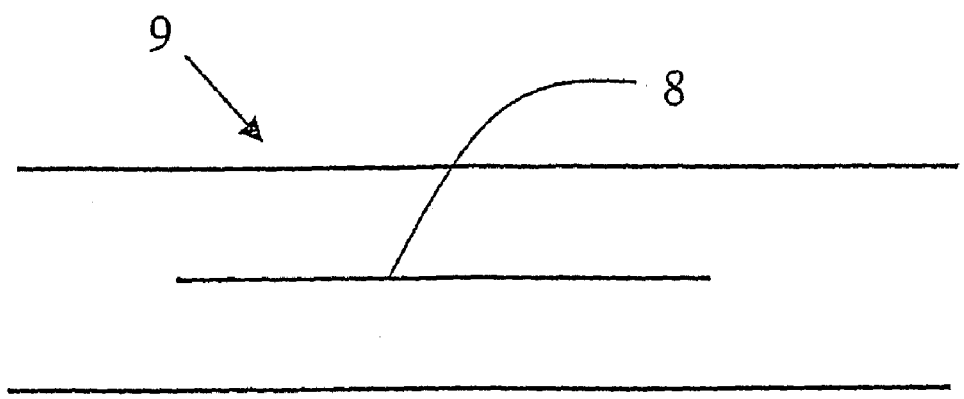
FIG. 3 is a fragmentary view of a fluid-absorbing product.

FIG. 3 illustrates a use of a nonwoven made from the hydrophilic polyolefin materials of the invention for absorbing fluids. In this embodiment, a hydrophilic nonwoven 8 is contained in a product 9, i.e., arranged between two further layers. The hydrophilic nonwoven 8 is in a position to absorb moisture in the product 9, and to store it in itself. For example, the product 9 can be used for releasing again the moisture stored in the hydrophilic nonwoven 8, when need arises. The release may occur, for example, by heating the product 9.

In the following, the invention is described in greater detail with reference to examples.

Different polyolefin mixtures were prepared, and polyolefin materials were produced therefrom by means of the Lurgi-Docan spunbonding process in the form of a nonwoven with a basis weight of 30 g/m$^2$. In greater detail, the nonwovens were produced from the following materials.

Reference

As Reference a spunbond was produced from 100% by weight of homopropylene (manufacturer: Basell, Mople HP 460R), which contains a standard base stabilization for the extrusion process.

Mixture 1

Mixture 1 contained 98% by weight of the homopolypropylene according to the Reference as well as in addition 2% by weight of the melt additive $C_{25}H_{51}$—CO—O—$CH_2$—$CH_2$—O—$CH_3$.

Mixture 2

Mixture 2 contained 97.6% by weight of the homopolypropylene according to the Reference, 2% by weight of the melt additive of Mixture 1, as well as in addition 0.4% by weight of a titanium dioxide master batch (manufacturer: Clariant, Remfin RCLAP, grain size 2.2 to 2.6 microns).

Both the Reference and the Mixtures 1 and 2 were processed to a spunbond under identical process conditions.

In accordance with the invention, the activation of the fatty acid esters on the fiber surface of the nonwovens made from Mixture 2 occurred with the use of a hand spray gun by applying a Formulation B in the form of an aqueous preparation containing, among other things, a silicone compound, which is cationically modified, and a quaternary ammonium compound, which is a quaternized ester from fatty acids and triethanol amine, to the nonwoven, and by subsequently drying it at room temperature for a period of 10 hours.

For comparison, a nonwoven from Mixture 2 was treated in the same way with the use of a Formulation A in the form of an aqueous preparation. The Mixtures contain the following quantities respectively of Formulations A and Formulations B:

Sample 8: 0.15 wt % of Formulation A
Sample 9: 0.05 wt % of Formulation B
Sample 10: 0.15 wt % of Formulation B As can be noted from Table 2, the mixtures of the Samples 2 to 5 of a 100% polypropylene nonwoven contain as Reference likewise different quantities of Formulations A and Formulations B.

In addition, Sample 11 includes a treatment with pure water. With that, the activating effect of mere moistening is examined with the use of Formulation A or Formulation B.

The hydrophilicity of the samples or permanence of the hydrophilic properties were determined by repeated strike-through time measurements according to the EDANA test method ERT 154.0-00 or repeated runoff measurements according to the EDANA test method ERT 152.0-99 (Tables 2 and 3).

Moreover, the washout behavior of the spunbonds produced from Mixtures 1 and 2 was determined according to U.S. Pat. No. 5,945,175 (Table 1).

The washout behavior was determined by means of the following test method:

Before immersing the spunbond into water, one determines the surface tension thereof according to DIN 53914 [German Industrial Standard]. From the nonwoven, one punches out samples (appr. 2.5×22 cm, about 0.17 g) and immerses them into 80 ml water for 30 minutes. Subsequently, one measures again the surface tension of the water.

TABLE 1

| Surface Tension (mN/m) | Mixture 1 | Mixture 2 |
| --- | --- | --- |
| Before the test | 72.5 | 72.5 |
| After the test | 65.5 | 66.8 | woven. For this reason, the test was discontinued each time after 60 seconds. The nonwovens produced with the melt additive according to Mixtures 1 and 2, however, showed repeated strike-through times which were below 4 seconds. As can be noted from Table 2, the times of the nonwoven from Mixture 1 were somewhat less than the times of the nonwoven from Mixture 2. Whereas in the case of the nonwoven of Mixture 1, the hydrophilic properties of the nonwoven slightly decrease after the first gush, the hydrophilic property of the nonwoven from Mixture 2 increases in the further gushes.

As can be noted from the times shown in Table 2, the nonwoven treated with the melt additive is capable of seeing to a rapid permeability of the applied synthetic urine not only in the first gush. Rather, this property moreover exists in the case of multiple wettings. This is especially important, when this type of nonwoven is used as top sheet in a diaper, napkin, or incontinence product. In their case, the product has to absorb and distribute not just a one-time fluid gush. Rather, it is required that such an absorption and distribution of fluid be also repeatable. To increase the wearing comfort of such a hygiene product for the user, the nonwoven has advantageously a repeated strike-through time, which is below 4 seconds even after three test runs.

TABLE 2

| | Repeated Strike-Through Time | | | | | | | | | | |
| --- | --- | --- | --- | --- | --- | --- | --- | --- | --- | --- | --- |
| | Sample | | | | | | | | | | |
| | 1 Reference | 2 Reference | 3 Reference | 4 Reference | 5 Reference | 6 Mixture 1 | 7 Mixture 2 | 8 Mixture 2 | 9 Mixture 2 | 10 Mixture 2 | 11 Mixture 2 |
| Activation | — | 0.15 wt % FA | 0.05 wt % FB | 0.15 wt % FB | 0.3 wt % FB | — | — | 0.15 wt % FA | 0.05 wt % FB | 0.15 wt % FB | Water |
| 1st gush in sec. | >60 | 1.8 | >30 | 2.5 | 2.1 | 2.3 | 3.8 | 1.6 | 1.8 | 1.7 | 2.0 |
| 2nd gush in sec. | >60 | >30 | >30 | 14.8 | 7.3 | 2.9 | 3.3 | 3.0 | 2.6 | 2.4 | 2.9 |
| 3rd gush in sec. | >60 | >30 | >30 | 12.4 | 7.8 | 2.8 | 2.9 | 3.3 | 2.7 | 2.5 | 2.9 |

FA = Formulation A
FB = Formulation B

In the case of polyolefins with a subsequent hydrophilic treatment, the surface tension normally falls clearly below 60 mN/m after the "washout" test. As shown by the test results for both Mixture 1 and Mixture 2, the surface tension remains, however, approximately constant in the case of the nonwovens produced in accordance with the invention. From that, one can draw the conclusion that a washout of the melt additive does not occur. Mixtures 1 and 2, as well as further mixtures in accordance with the invention enable a production of permanently hydrophilic nonwovens. In particular, the melt additive is added in such a quantity that after the washout test, the water has a surface tension that varies by less than 15% from the original surface tension. Preferably, the variation of the surface tension of the water is in a range below 2%. An advantageous surface tension of the water after washing out the nonwoven is in a range from 60 mN/m to 70 mN/m.

The repeated strike-through time according to EDANA ERT 154.0.00 is shown in Table 2.

The Reference nonwoven had hydrophilic properties as are typical of polyolefins. The applied synthetic urine (solution of 0.9% sodium chloride) was unable to penetrate the non- It is known that fatty acid esters can also be used as dispersants for inorganic fillers, for example pigments. EP 0 605 831 A1 discloses the corresponding addition of fatty acid esters to mixtures consisting of ethylene/olefin copolymers and inorganic fillers. However, as a comparison of the properties of the nonwovens made from Mixtures 1 and 2 shows, the melt additive does not act as dispersant, but obviously only as hydrophiling agent on the fiber surface. Likewise, when adding titanium dioxide (Mixture 2), low values are measured for the repeated strike-through time.

As expected, Sample 1 shows the hydrophobic properties that are typical of the polyolefins, and which are characterized by long repeated strike-through times.

The application of Formulation A in accordance with the invention to the surface of the polyolefin material (nonwoven: Sample 8) leads to a short-term improvement of the hydrophilicity level (low strike-through and runoff values) of the nonwoven that is treated with the melt additive. However, the runoff values deteriorate as the number of repetitions increases.

Yet, the small quantity of Formulation A (0.05% by weight in the case of Sample 8), which does not show yet a hydrophiling effect on the 100% PP nonwoven (Sample 2), causes a significant improvement in the permanence of the hydrophilicity in combination with a hydrophiling melt additive (Sample 8).

Surprisingly, it was found when small quantities of Formulation B (Samples 9-10) were applied in accordance with the invention to the fiber surface of the polyolefin material, that both the hydrophilicity level (low strike-through and runoff values) and the permanence of the hydrophilic properties are improved in comparison with a polyolefin material (nonwoven: Sample 7) that was modified only with the melt additive.

Obviously, the Formulation B containing a cationically modified silicone and a quaternary ammonium compound, and which is subsequently applied in small quantities, serves as activator.

Whereas Samples 3-5 show effective the second gush in the repeated strike-through and runoff measurements a strong decrease in hydrophilicity, which is due to a washout of Formulation B, Samples 9 and 10 show an improvement in the permanence of the hydrophilicity.

As a result of activating a nonwoven that is modified with a melt additive, with the aid of small quantities of Formulation B, preferably 0.05 to 0.15% by weight, one obtains in accordance with the invention nonwovens according to Samples 9 and 10, which distinguish themselves by an excellent durable hydrophilicity. This property profile cannot be realized with Formulation B alone and not without the use of a melt additive. An application of Formulation B in a quantity of 0.3% by weight to a 100% PP nonwoven according to Sample 5 is too low to impart to the material a hydrophilicity and permanence of the hydrophilicity comparable to Samples 8 and 9. A comparison of both hydrophilicity and permanence of the hydrophilic properties of Sample 11 and Sample 7 shows that the treatment with pure water only causes no significant activating effects.

Advantageously, nonwovens that are produced by subsequent activation of the hydrophilic melt additive distinguish themselves by a clearly improved hydrophilicity in comparison with a nonactivated nonwoven, in particular in the case of an initial wetting of the dry nonwoven.

The invention claimed is:

1. Hydrophilic polyolefin material comprising a polymeric mixture of at least one polyolefin and at least one melt additive containing a fatty acid ester of the general formula

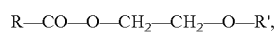

where R is a straight-chain or branched-chain alkyl residue with 23 to 35 carbon atoms, and where

wherein the fatty acid is intermixed and dispersed in the polymeric mixture; and a composition of a silicone compound and a quaternary ammonium compound disposed on a surface of the polyolefin material, wherein fatty acids disposed in the polymeric mixture towards the surface of the polyolefin material are activated by applying the composition of a silicone compound and a quaternary ammonium compound to the surface of the polyolefin material.

2. Polyolefin material of claim 1, wherein the silicon compound is cationically modified.

3. Polyolefin material of claim 1, wherein the quaternary ammonium compound is a quaternized ester of fatty acids and triethanol amine.

4. Polyolefin material of claim 1, wherein the polyolefin material comprises a fiber and the composition of a silicone compound and a quaternary ammonium compound is applied on a fiber surface in the form of an aqueous preparation.

5. Polyolefin material of claim 1, wherein the composition of a silicone compound and a quaternary ammonium compound on a fiber surface is set on the surface physically.

6. Polyolefin material of claim 1, which contains 0.01 to 0.5% by weight of the composition of a silicone compound and a quaternary ammonium compound.

7. Fibers produced from a polyolefin material of claim 1.

8. Filaments produced from a polyolefin material of claim 1.

9. A nonwoven produced from a polyolefin material of claim 1.

TABLE 3

Repeated Runoff

| | Sample | | | | | | | | | | |
|---|---|---|---|---|---|---|---|---|---|---|---|
| | 1 Reference | 2 Reference | 3 Reference | 4 Reference | 5 Reference | 6 Mixture 1 | 7 Mixture 2 | 8 Mixture 2 | 9 Mixture 2 | 10 Mixture 2 | 11 Mixture 2 |
| Activation | — | 0.15 wt % FA | 0.05 wt % FB | 0.15 wt % FB | 0.3 wt % FB | — | — | 0.15 wt % FA | 0.05 wt % FB | 0.15 wt % FB | Water |
| Runoff 1st gush in wt % | 100 | 11 | 93 | 55 | 50 | — | 15 | 1 | 16 | 15 | 42 |
| Runoff 2nd gush in wt % | 100 | 51 | 93 | 654 | 47 | — | 13 | 2 | 7 | 4 | 17 |
| Runoff 3rd gush in wt % | 100 | 80 | | 73 | 73 | — | 48 | 24 | 11 | 5 | 51 |
| Runoff 4th gush in wt % | — | — | — | — | — | — | — | 47 | 12 | 3 | 62 |
| Runoff 5th gush in wt % | — | — | — | — | — | — | — | 44 | 11 | 12 | 60 |

FA = Formulation A
FB = Formulation B

10. The nonwoven of claim 9, wherein it has repeated strike-through time measurements according to the EDANA test method ERT 154.0.00 of smaller than 5 seconds.

11. The nonwoven of claim 9, wherein it has in the determination of a repeated runoff according to the EDANA test method ERT 152.0-99, a repeated runoff of less than 25% by weight of the test fluid based on an applied quantity of fluid.

12. Method of producing hydrophilic polyolefin material comprising
forming a polymeric mixture of a polyolefin and a melt additive containing a fatty ester, wherein the fatty acid is dispersed within the polymeric mixture;
extruding the polymeric mixture to form a polyolefin material;
applying a composition of a silicone compound and a quaternary ammonium compound to a surface of the polyolefin material;
activating hydrophilic properties of fatty acids disposed towards the surface of the polyolefin material with said silicone compound and a quaternary ammonium compound such that the surface of the polyolefin material is hydrophilic.

13. Method of claim 12, further comprising the step of extruding the polymeric mixture in the form of a fiber.

14. Method of claim 12, comprising applying the composition of a silicone compound and a quaternary ammonium compound to a surface of the polyolefin material to the surface of the polyolefin material in an amount from about 0.01 to 5 weight percent based on the total weight of the polyolefin material.

15. Hydrophilic polyolefin material comprising:
a polyolefin material;
a fatty acid ester intermixed and dispersed within the polyolefin material, the fatty acid having the general formula:

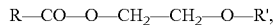

where R is a straight-chain or branched-chain alkyl residue with 23 to 35 carbon atoms, and where $R'=H, —CH_3, —C_2H_5, —C_3H_7, —C_4H_9,$ wherein the fatty acid is added as a melt additive during extrusion of the polyolefin material, and wherein at least some of the fatty acid is disposed towards a surface of the polyolefin material;
a surface active coating disposed on a surface of the polyolefin material, the surface active coating comprising a silicone compound and a quaternary ammonium compound, wherein the surface active coating activates fatty acids disposed towards the surface of the polyolefin material such that the polyolefin material is rendered hydrophilic.

16. The hydrophilic polyolefin material of claim 15, wherein the coating comprising a silicone compound and a quaternary ammonium compound is present on the surface of the polyolefin material in an amount from about 0.05 to 0.15 weight percent, based on the total weight of the polyolefin material.

17. The hydrophilic polyolefin material of claim 15, wherein the fatty acid is present in an amount from 0.05 to 2 weight percent, based on the total weight of the polyolefin material and the fatty acid.

18. The hydrophilic polyolefin material of claim 15, wherein the fatty acid is present in an amount from 0.1 to 0.5 weight percent, based on the total weight of the polyolefin material and the fatty acid.

19. The hydrophilic polyolefin material of claim 15, wherein the polyolefin material further comprises up to about 1 weight percent of titanium dioxide.

20. The hydrophilic polyolefin material of claim 15, wherein the polyolefin material is in the form of a fiber.

21. The hydrophilic polyolefin material of claim 15, wherein the polyolefin material is in the form of a nonwoven.

* * * * *